United States Patent [19]

Lemon

[11] Patent Number: 4,934,495
[45] Date of Patent: Jun. 19, 1990

[54] LOCK-UP CLUTCH FOR FOUR ELEMENT TORQUE CONVERTER

[75] Inventor: Robert W. Lemon, Farmington Hills, Mich.

[73] Assignee: Rockwell International Corporation, Pittsburgh, Pa.

[21] Appl. No.: 330,003

[22] Filed: Mar. 29, 1989

[51] Int. Cl.$^5$ ............................................. F16H 45/02
[52] U.S. Cl. .................................. 192/3.26; 192/3.29
[58] Field of Search ................... 192/3.25, 3.26, 3.27, 192/3.28, 3.29; 74/645, 732, 733; 60/340

[56] References Cited

U.S. PATENT DOCUMENTS

| | | | |
|---|---|---|---|
| 2,905,025 | 9/1959 | Karlsson et al. | 74/732 |
| 2,987,940 | 6/1961 | Tuck et al. | 60/340 X |
| 2,995,956 | 8/1961 | Moore | 192/3.25 |
| 3,073,181 | 1/1963 | Kronogard | 74/732 |
| 3,463,033 | 8/1969 | Fisher | 192/3.26 |

FOREIGN PATENT DOCUMENTS

| | | | |
|---|---|---|---|
| 222753 | 7/1959 | Australia | 192/3.21 |
| 1019154 | 5/1983 | U.S.S.R. | 192/3.25 |

Primary Examiner—Rodney H. Bonck

[57] ABSTRACT

A hydrodynamic torque converter comprises an input shaft, first and second output shafts, an impeller driven by the input shaft, primary and secondary turbines arranged to drive the first and second output shafts respectively, a stator, and first and second clutch elements arranged to provide a direct drive to the first and second output shafts from the input shaft of the torque converter.

10 Claims, 2 Drawing Sheets

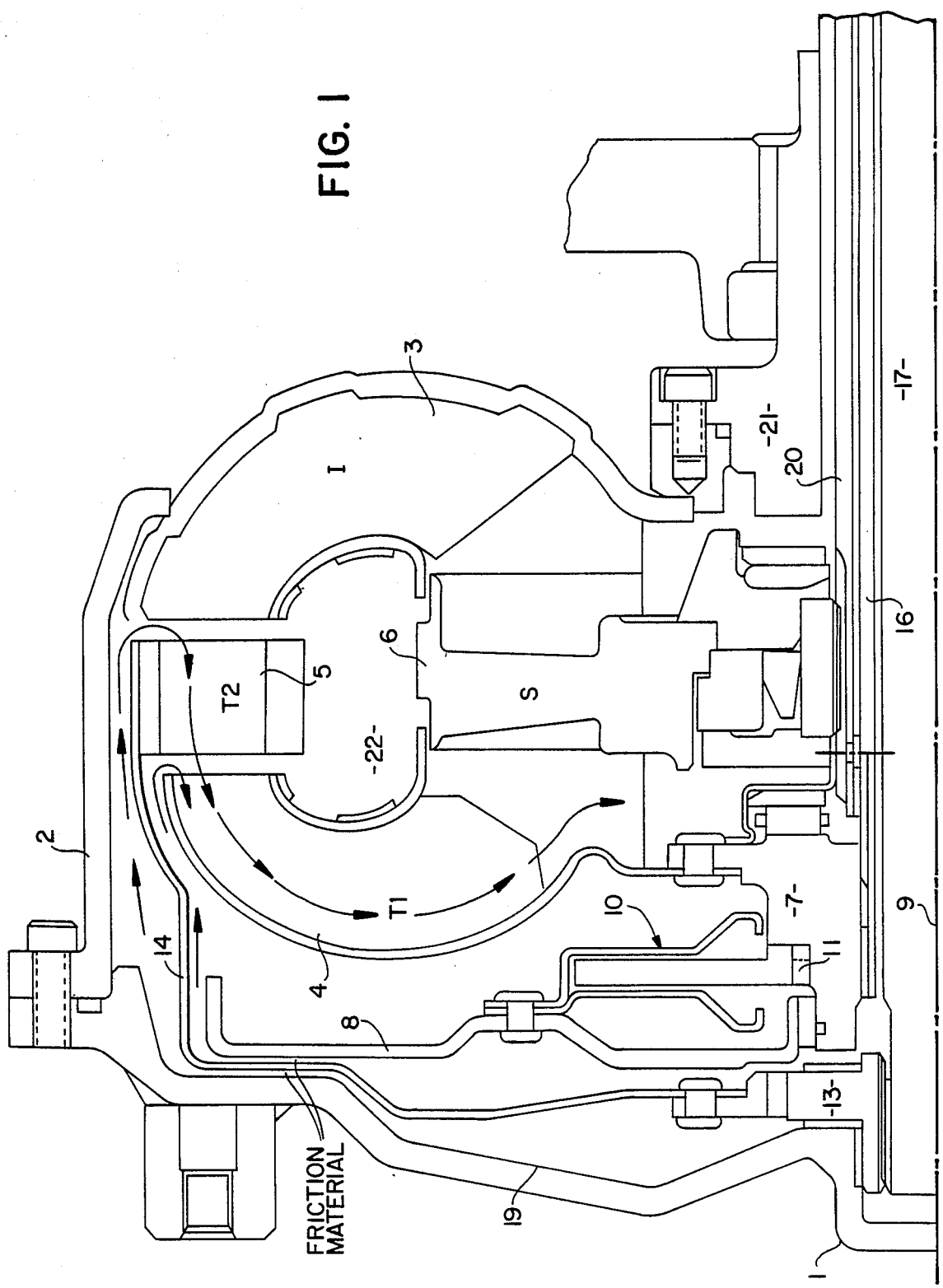

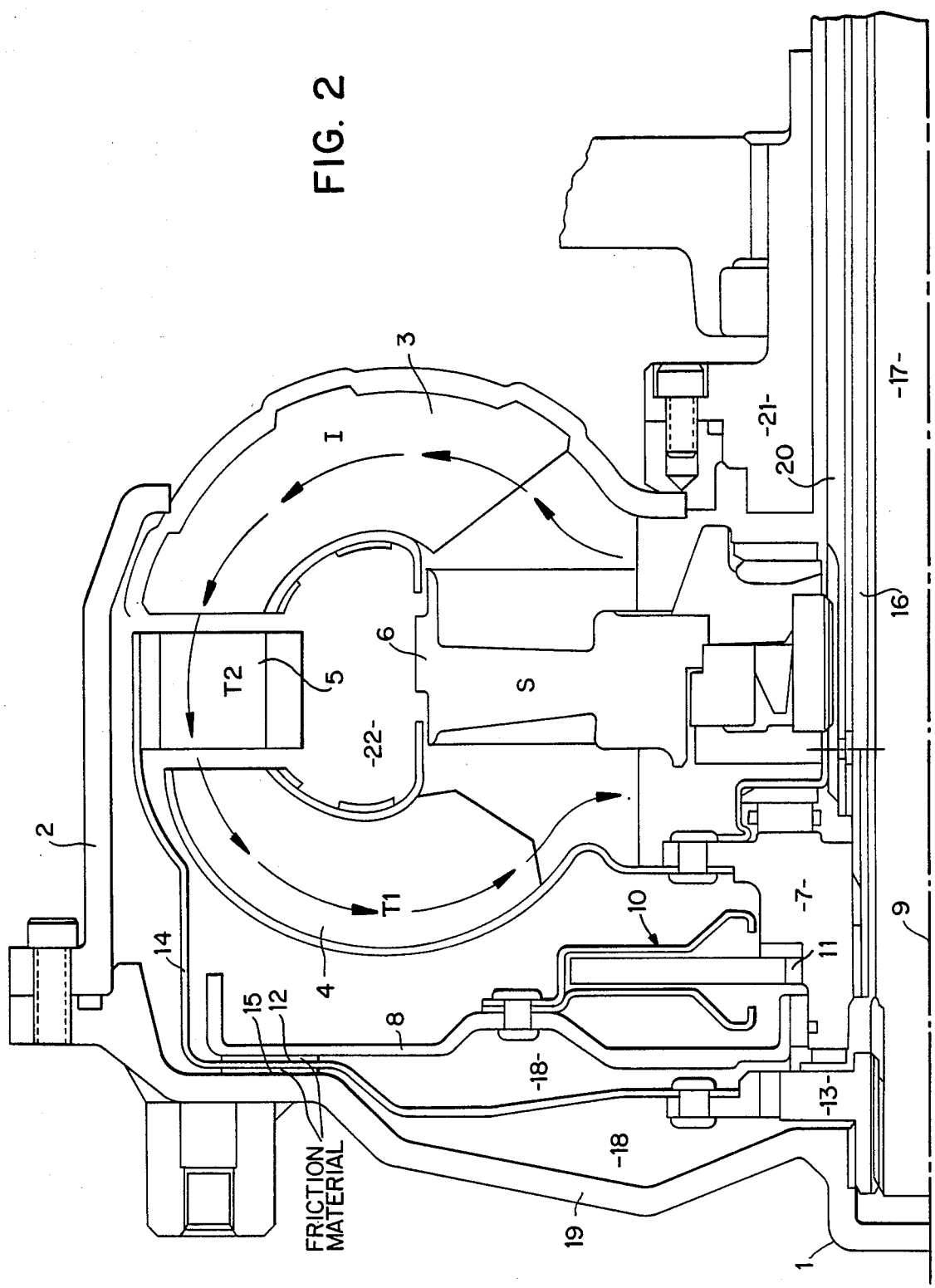

LOCK-UP CLUTCH FOR FOUR ELEMENT TORQUE CONVERTER

BACKGROUND OF THE INVENTION (1) Field of the Invention

This invention relates to four element torque converters providing plural power paths between the torque converter and an associated transmission, and in particular for the lock-up clutch employed in such a torque converter.

(2) Description of the Related Art

In conventional four element torque converters of the type provided by this invention, an input shaft to the torque converter drives the impeller of the converter. The impeller fluidically drives a primary and secondary turbine of the torque converter which both in turn drive primary and secondary input shafts to the associated transmission mechanism. These torque converters also commonly employ a stator coupled to the transmission housing through a one-way clutch.

In the prior art torque converters of this type, if a direct drive to the transmission assembly bypassing the torque converter is desired, it is common practice to provide a direct drive clutch coupling one of the primary or secondary turbines and their associated shafts to the input shaft of the torque converter. Alternatively, a separate or third input shaft separate from the shafts of the primary and secondary torque converter turbines would be provided to be directly clutched to the torque converter input shaft to provide the direct drive to the transmission assembly bypassing the torque converter fluid coupling.

The former of these methods of providing a direct drive bypassing a four element torque converter limits the type of transmission gearing assembly that could be employed with the four element torque converter to one adapted to receive only one direct drive input to the transmission gearing assembly. The gearing of the transmission assembly driven by the torque converter turbine that could not be directly clutched to the input shaft of the torque converter could not be utilized in the direct drive speed ratios.

Those transmissions employing a third concentric shaft for direct drive bypassing the four element torque converter require a more complex transmission assembly and more space for that assembly to provide for the third input shaft.

The present invention seeks to solve these problems by providing an improved lock-up clutch for a four element torque converter which provides a direct drive input from the input shaft of the torque converter to the primary and secondary transmission input shafts, thereby providing direct drive to the associated transmission gearing arrangement without requiring a third input shaft.

SUMMARY OF THE INVENTION

The improved torque converter of the present invention includes four elements with an impeller coupled to the converter housing and an input shaft which is driven by a prime mover, a primary turbine fluidly driven by the impeller and coupled to a primary turbine shaft that provides a first input shaft to the automatic transmission assembly associated with the subject four element torque converter, a secondary turbine fluidly driven by the impeller and coupled to a secondary turbine shaft that provides the second input shaft to the gearing transmission assembly associated with the torque converter, and a stator connected to a stator shaft by a one-way brake.

The primary turbine is fixed to a hub that is spline connected to the first input shaft. A primary clutch element is spline connected to the hub of the primary turbine in a manner that permits movement of the primary clutch element along the axis of the transmission toward and away from an interior surface of the torque converter housing.

The secondary turbine is drivingly connected to a secondary hub that is spline connected to the secondary input shaft. The secondary turbine is connected to the secondary hub by a secondary clutch element that extends rom the secondary turbine, around the primary clutch element, and between the primary clutch element and the interior surface of the torque converter cover to the secondary hub.

Both the primary and the secondary clutch elements have frictional material secured to the side of each of the elements facing the interior surface of the torque converter cover.

To engage the lock-up clutch, back pressure is built up in the interior of the torque converter housing. The back pressure acts on the primary clutch element to cause the element to move toward the interior surface of the torque converter cover, thereby engaging with the secondary clutch element, and causing both the primary and the secondary clutch elements to engage with the interior wall of the torque converter cover. The engagement of both the primary and secondary clutch elements with the interior wall of the torque converter results in a one-to-one direct drive from the input shaft of the torque converter to the primary and secondary input shafts of the transmission.

To disengage the clutch, fluid pressure is supplied between the primary clutch element and the torque converter cover, thereby separating the primary clutch element from the secondary clutch element and the secondary clutch element from the interior wall of the torque converter cover. This disengages the one-to-one coupling between the input shaft and the primary and secondary input shafts, and reestablishes the fluid drive between the torque converter impeller and the primary and secondary turbines.

BRIEF DESCRIPTION OF THE DRAWINGS

Further objects and features of the present invention are revealed in the following description of the preferred embodiment of the invention and in the drawing figures wherein:

FIG. 1 shows the four element torque converter of the present invention in its lock-up clutch disengaged state;

FIG. 2 shows the four element torque converter of the present invention in its lock-up clutch engaged state.

DESCRIPTION OF THE PREFERRED EMBODIMENT

The present invention as shown in FIG. 1 provides an improved lock-up clutch assembly for a four element torque converter comprising a torque converter input shaft 1 driven by a prime mover (not shown), a torque converter impeller 3 secured to and driven by a torque converter cover 2, which is in turn driven by the torque converter input 1; a primary torque converter turbine 4; a secondary torque converter turbine 5; and a stator 6.

As seen in FIGS. 1 and 2, the primary turbine 4 is secured to a first hub 7. A primary clutch element 8 is also secured for rotation with the first hub 7, while permitting the axial movement of the primary clutch element 8 relative to the first hub 7 along the axis 9 of the torque converter. The primary clutch element 8 is shown connected to the first hub 7 for rotation therewith by a torsional damper assembly 10 that is connected at 11 to the first hub 7. However, it is not necessary that the primary clutch element 8 be connected to the first hub 7 by a torsional damper. Any other means of connecting the primary clutch element 8 to the hub 7 may be employed, such as a spline connection, without departing from the scope of the present invention. On the left hand surface of the primary clutch element 8 as viewed in FIGS. 1 and 2, a frictional material 12 is secured.

The secondary turbine 5 is secured to a second hub 13 by a secondary clutch element 14. As seen in FIGS. 1 and 2, the secondary clutch element 14 extends from the secondary turbine 5, around the primary clutch element 8 and is secured to the hub 13. The secondary clutch element 14 is shown secured directly to the hub 13. However, it is not required that the secondary clutch element 14 be secured directly to the hub 13, and in certain applications it may be desirous to provide a torsional damper between the secondary clutch element 14 and the hub 13 as is done with regard to the primary clutch element 8. A frictional material 15 is secured to the left hand side of the secondary clutch element 14 in the vicinity of the frictional material 12 as viewed in FIGS. 1 and 2.

The first hub 7 is shown in the drawing figures spline connected to a first transmission input shaft 16 and the second hub 13 is shown in the drawing figures spline connected to a second transmission input shaft 17.

In operation, rotation of the input shaft 1 imparts rotation to the converter cover 2 and the torque converter impeller 3. Rotation of the impeller 3 generates a fluid flow in the torque converter which fluidically drives the primary turbine 4 and the secondary turbine 5 to rotate about the torque converter axis 9. The rotation of the primary turbine 4 rotates the first hub 7 which, in turn, imparts rotation to the first transmission input shaft 16 through the spline connection.

The rotation of the secondary turbine 5 rotates the secondary clutch element 14 and the second hub 13 about the torque converter axis 9 and, in turn, imparts rotation to the second transmission input shaft 17.

In the above described fluid phase of operation of the improved four element torque converter with the lock-up clutch disengaged, the torque multiplying function is utilized as the torque converter drives the first transmission input shaft 16 and the second transmission input shaft 17.

The relative positions of the torque converter elements during converter operation are shown in FIG. 1. For converter operation with the lock-up clutch disengaged, hydraulic fluid under pressure is supplied in a conduit between the first transmission input shaft 16 and the second transmission input shaft 17. This hydraulic fluid is supplied to the region 18 (by a pump not illustrated) between the primary clutch element 8 and the interior wall 19 of the torque converter cover 2. The hydraulic fluid passes on both sides of the secondary clutch element 14 to cause the secondary clutch element 14 to separate from the interior wall 19 of the torque converter cover 2, and to cause the primary clutch element 8 to move axially to the right as shown in the drawing figures separating the primary clutch element 8 from the secondary clutch element 14. As the hydraulic fluid passes between the interior wall 19 and the secondary clutch element 14, and between the secondary clutch element 14 and the primary clutch element 18, the lock-up clutch is disengaged and the first and second transmission input shafts 16, 17 are driven by the primary and secondary turbines 4, 5 respectively, which are in turn fluidically driven by the torque converter impeller 3. The hydraulic fluid is drained through a conduit between shafts 16 and 20.

For direct drive or lock-up operation (FIG. 2), the fluid conduit between the first transmission input shaft 16 and the second transmission input 17 is open to drain; a fluid conduit between the stator shaft 20 and the converter hub 21 is supplied with hydraulic fluid; and back pressure is maintained in a fluid conduit between first transmission input shaft 16 and stator shaft 20. This back pressure can be developed by restricting the opening to the drain or to an oil cooler (not shown) or by any other suitable means. The hydraulic fluid pressure in the impeller turbine circuit exists within the interior of the torque converter housing 2 at the outer peripheral region in particular. The back pressure maintained in the conduit between input shaft 16 and stator shaft 20 maintains most of this pressure within the interior of the torque converter which in turn acts on the right side of the primary clutch element 8, while the left side of the clutch is in communication with the drain conduit between first input shaft 16 and second shaft 17. The unbalanced fluid pressure force on the right side of the primary clutch element 8 causes the primary clutch element 8 to move axially to the left, which causes the frictional material 12 of the primary clutch element 8 to engage the right side of the secondary clutch element 14 and to displace the secondary clutch element 14 axially to the left toward the interior wall 19 of the torque converter cover 2. When the pressure on the primary clutch element 8 is sufficient to cause both the primary clutch element 8 and the secondary clutch element 14 to move axially to the left a sufficient amount so that the friction material 15 secured to the secondary clutch element 14 engages the interior wall 19 of the torque converter cover 2, the lock-up drive bypassing the fluid coupling of the four element torque converter is established. In the lock-up drive operation, the rotation of the input shaft bypasses the fluid coupling of the four element torque converter and directly drives the first and second transmission input shafts 16, 17.

The engagement of the friction material 15 with the interior wall 19 of the torque converter cover 2 and the friction material 12 with the second clutch element 14 forms a seal separating the interior 22 of the torque converter housing from the area 18 to the left of the primary clutch element 8, thereby maintaining a pressure differential between these two areas. This hydraulic pressure differential provides the actuating force on the clutch elements 8, 14 needed to provide the required torque capacity to make the lock-up clutch functional.

While the present invention has been described by reference to a specific embodiment, it should be understood that modifications and variations of the invention may be constructed without departing from the scope of the invention defined in the following claims.

What is claimed is:
1. A hydrodynamic torque converter comprising:
an input shaft;

a converter housing;
an impeller arranged to be driven by the input shaft;
a primary turbine;
a secondary turbine;
a stator,
a first output shaft arranged to be driven by the primary turbine;
a second output shaft arranged to be driven by the secondary turbine;
a first clutch assembly arranged to selectively couple the first output shaft to the input shaft;
and a second clutch assembly arranged to selectively couple the second output shaft to the input shaft.

2. A hydrodynamic torque converter as recited in claim 1 wherein the first and second clutch assemblies are arranged to simultaneously couple the first and second output shafts to the input shaft.

3. A hydrodynamic torque converter as recited in claim 1 wherein said converter housing is driven by the input shaft and is arranged to drive said impeller; anD said second clutch assembly includes a secondary clutch element arranged to be selectively coupled to directly to said converter housing.

4. A hydrodynamic torque converter as recited in claim 3 wherein said first clutch assembly includes a primary clutch element arranged to be selectively coupled directly to said secondary clutch element of said second clutch assembly and said converter housing.

5. A hydrodynamic torque converter as recited in claim 1 wherein said second clutch assembly includes a secondary clutch element drivingly interconnecting the secondary turbine and said second output shaft.

6. A hydrodynamic torque converter as recited in claim 5 wherein said secondary clutch element is located between said converter housing and said primary clutch element.

7. A hydrodynamic torque converter as recited in claim 6 wherein said primary clutch element is arranged between the primary turbine and said secondary clutch element.

8. A hydrodynamic torque converter as recited in claim 1 wherein the first output shaft is a sleeve shaft arranged around the second output shaft and forming a first fluid conduit therebetween, said first fluid conduit being arranged to supply fluid to the torque converter during converter operation.

9. A hydrodynamic torque converter comprising:
an input shaft;
a converter housing;
an impeller arranged to be driven by the input shaft;
a primary turbine;
a secondary turbine;
a stator,
a first output shaft arranged to be driven by the primary turbine;
a second output shaft arranged to be driven by the secondary turbine, said first output shaft comprising a sleeve shaft arranged around the second output shaft and forming a first fluid conduit therebetween for supplying fluid to the torque converter during converter operation;
a first clutch assembly arranged to selectively couple the first output shaft to the input shaft;
a second clutch assembly arranged to selectively couple the second output shaft to the input shaft; and
a stator sleeve shaft arranged around the first output shaft forming a second fluid conduit therebetween for draining fluid from the torque converter housing.

10. A hydrodynamic torque converter as recited in claim 9 further comprising a converter hub sleeve disposed around the stator sleeve shaft forming a third fluid conduit therebetween, said third conduit arranged to supply fluid to the torque converter housing.

* * * * *